(12) United States Patent
Nakagawa et al.

(10) Patent No.: US 12,006,100 B2
(45) Date of Patent: Jun. 11, 2024

(54) METAL CAP AND METHOD FOR MANUFACTURING SAME

(71) Applicant: NIPPON CLOSURES CO., LTD., Tokyo (JP)

(72) Inventors: Sei Nakagawa, Kanagawa (JP); Daisuke Tsuchimoto, Kanagawa (JP)

(73) Assignee: NIPPON CLOSURES CO., LTD., Tokyo (JP)

( * ) Notice: Subject to any disclaimer, the term of this patent is extended or adjusted under 35 U.S.C. 154(b) by 0 days.

(21) Appl. No.: 17/911,858

(22) PCT Filed: Mar. 10, 2021

(86) PCT No.: PCT/JP2021/009638
§ 371 (c)(1),
(2) Date: Sep. 15, 2022

(87) PCT Pub. No.: WO2021/193075
PCT Pub. Date: Sep. 30, 2021

(65) Prior Publication Data
US 2023/0019020 A1    Jan. 19, 2023

(30) Foreign Application Priority Data
Mar. 23, 2020 (JP) .................................. 2020-051611

(51) Int. Cl.
*B65D 41/02* (2006.01)
*B65D 51/24* (2006.01)

(52) U.S. Cl.
CPC ......... *B65D 41/023* (2013.01); *B65D 51/242* (2013.01)

(58) Field of Classification Search
CPC .... B65D 41/023; B65D 41/42; B65D 41/425; B65D 41/465; B65D 51/242; B65D 53/04; Y02E 60/10
(Continued)

(56) References Cited

U.S. PATENT DOCUMENTS 2,068,444 A * 1/1937 Breckenridge ...... B65D 51/243
215/257
4,003,488 A * 1/1977 Moller ................... B65D 41/42
215/254
(Continued)

FOREIGN PATENT DOCUMENTS

JP      52150188 A   * 12/1977
JP      55-71275        5/1980
(Continued)

OTHER PUBLICATIONS

Notice of Reasons for Refusal issued Nov. 29, 2023 in Japanese Patent Application No. 2020-051611, with English language translation.

*Primary Examiner* — Chun Hoi Cheung
*Assistant Examiner* — Brijesh V. Patel
(74) *Attorney, Agent, or Firm* — Wenderoth, Lind & Ponack, L.L.P.

(57) ABSTRACT

A metal cap that has an adhesive inner surface coating film and a masking layer. A coating film of a coating composition containing an adhesive component in a base resin and a masking agent is formed between the top plate portion inner surface of the metal cap shell and the olefin resin liner. The coating film has an adhesive portion adhesive to the olefin resin liner and a non-adhesive portion non-adhesive or weakly adhesive to the olefin resin liner. The adhesive portion is formed by positioning the adhesive component on the coating film surface. The non-adhesive portion has the masking layer of the masking agent at a side facing the metal cap shell, such that a sea-island structure is formed on the coating film surface corresponding to the masking layer, in which the adhesive component is a dispersion phase and the base resin is a continuous phase.

3 Claims, 3 Drawing Sheets

(58) Field of Classification Search
USPC ....... 215/228, 230, 347; 428/352, 35.9, 172, 428/40.1, 416, 418
See application file for complete search history.

(56) References Cited

U.S. PATENT DOCUMENTS

| | | | | |
|---|---|---|---|---|
| 4,062,997 | A | * | 12/1977 | Hotta .................... B32B 15/085 428/416 |
| 4,253,580 | A | * | 3/1981 | Doi ........................ B65D 53/00 215/230 |
| 4,256,234 | A | * | 3/1981 | Mori ...................... B65D 53/04 524/232 |
| 4,340,149 | A | * | 7/1982 | Mori ...................... B65D 53/04 215/343 |
| 4,372,457 | A | | 2/1983 | Kunimoto et al. |
| 4,395,446 | A | * | 7/1983 | Kunimoto .............. B65D 41/12 428/416 |
| 4,464,109 | A | * | 8/1984 | Giangiulio .............. F21S 13/00 220/613 |
| 5,551,141 | A | * | 9/1996 | De'Ath ................ B29C 45/1418 29/527.3 |
| 2003/0017294 | A1 | * | 1/2003 | MacDonell ............... B32B 3/14 428/40.1 |
| 2006/0043053 | A1 | * | 3/2006 | Herald ................. B65D 41/485 215/253 |
| 2016/0207671 | A1 | * | 7/2016 | Okubo .................... B65D 43/26 |
| 2019/0263570 | A1 | * | 8/2019 | Lo Piccolo ............ B65D 41/42 |
| 2021/0016933 | A1 | * | 1/2021 | Cepa ...................... B65D 53/04 |

FOREIGN PATENT DOCUMENTS

| | | | |
|---|---|---|---|
| JP | 58-52057 | | 3/1983 |
| JP | 11115937 | A * | 4/1999 |
| JP | 2004345653 | A * | 12/2004 |
| JP | 2006-241290 | | 9/2006 |
| JP | 2007-269336 | | 10/2007 |

\* cited by examiner

METAL CAP AND METHOD FOR MANUFACTURING SAME

TECHNICAL FIELD

The present invention relates to a metal cap comprising a metal cap shell and an olefin resin liner, and a method for manufacturing the same. The metal cap has a non-adhesive or weakly adhesive portion provided between the metal cap shell and the olefin resin liner. More specifically, the present invention relates to a metal cap with excellent productivity and a method for manufacturing the same, since in the method, coating of an adhesive inner surface coating composition and coating of a masking agent for forming a non-adhesive or weakly adhesive portion can be performed in a single step.

BACKGROUND ART

It has been known that a metal cap comprising a resin liner has a non-adhesive or weakly adhesive portion formed between the resin liner and on a top plate portion inner surface of the metal cap shell.

For instance, Patent Document 1 below proposes a container lid equipped with a liner that has a masking layer partly formed to make an olefin resin liner be non-adhesive to a metal cap shell. This prevents the liner from falling off from the metal cap shell and also improves its impact resistance sealability and stress cracking resistance.

An easily-openable cap proposed by Patent Document 2 below is a metal cap comprising a metal cap shell and a resin liner, and it can be unsealed by tearing the metal cap shell along a pair of scores extending from the lower end of a skirt portion formed on the metal cap shell toward the top plate portion. This cap has a part at which the resin liner is not adhered or weakly adhered to the metal cap shell top plate portion inner surface and also a part at which the resin liner is strongly adhesive and unpeelable therefrom. In this easily-openable cap, since a part non-adhesive or weakly adhesive to the metal cap shell is present, the scores formed on the metal cap shell can be broken easily. Furthermore, since there is a part strongly adhered to the metal cap shell in an unpeelable manner, the resin liner is integrated with the metal cap shell, so that they can be released easily in a single action manner from the container mouth portion.

The cap having a part at which a resin liner is not adhered or weakly adhered to the metal cap shell is usually shaped by: coating an inner surface coating material, which is adhesive to the resin liner, on the top plate portion inner surface of the metal cap shell, and curing the coating material; coating a masking agent at a part to be a non-adhesive or weakly adhesive portion on the adhesive inner surface coating film and curing the agent to form a masking layer; and feeding a molten resin to make a liner and embossing such that the resin liner is formed and at the same time, the metal cap shell and the resin liner are integrated.

PRIOR ART DOCUMENTS

Patent Documents

[Patent Document 1] JP S58-171359A
[Patent Document 2] Japanese Patent No. 4065690

SUMMARY OF THE INVENTION

Problem to be Solved by the Invention

As described above, a cap in which a masking layer to make a resin liner non-adhesive or weakly adhesive to a metal cap shell is formed is inferior in the productivity, since the production includes a step of forming an adhesive inner surface coating film for preventing the resin liner from falling off from the metal cap shell, and a step of forming a masking layer for making the resin liner non-adhesive or weakly adhesive, and these steps are required to be conducted separately.

Accordingly, it is an object of the present invention to provide a metal cap that is remarkably excellent in productivity and a method for manufacturing the same, since the adhesive inner surface coating film and the masking layer can be formed in the same step.

Means for Solving the Problems

A metal cap provided according to the present invention comprises: a metal cap shell having a top plate portion and a skirt portion extending downwardly from the periphery of the top plate portion; and an olefin resin liner on the top plate portion inner surface of the metal cap shell. In the metal cap, a coating film is formed between the top plate portion inner surface of the metal cap shell and the olefin resin liner. The coating film comprises a coating composition containing an adhesive component in a base resin and a masking agent, and the coating film has an adhesive portion that is adhesive to the olefin resin liner and a non-adhesive portion that is non-adhesive or weakly adhesive to the olefin resin liner. The adhesive portion of the coating film is formed by positioning the adhesive component of the coating composition on the coating film surface, the non-adhesive portion of the coating film has a masking layer of a masking agent at a side facing the metal cap shell, and a sea-island structure is formed on the coating film surface corresponding to the masking layer, in which the adhesive component of the coating composition is a dispersion phase and the base resin is a continuous phase.

It is preferable for the metal cap of the present invention that:
1. the coating amount of the masking agent is 1 to 25 mg/dm$^2$;
2. the coating amount of the coating composition is 25 to 45 mg/dm$^2$;
3. the coating amount of the coating composition is larger than the coating amount of the masking agent, and the masking layer is covered entirely or partly with the coating composition;
4. the masking agent is an oil-modified alkyd resin, the coating composition is a coating composition containing as the adhesive component an oxidized polyethylene or an acid-modified olefin-based resin and as the base resin an epoxy-phenol resin or a polyester-phenol resin; and,
5. the dispersion phase in the sea-island structure is 4 to 18 area %.

The present invention provides also a method for manufacturing a metal cap that comprises a metal cap shell having a top plate portion and a skirt portion extending downwardly from the periphery of the top plate portion, and an olefin resin liner via a coating film on the top plate portion inner surface of the metal cap shell. The method comprises: coating a masking agent on the top plate portion inner surface of the metal cap shell, at a position on which a non-adhesive portion that is non-adhesive or weakly adhesive to the olefin resin liner is to be formed; coating a coating composition containing an adhesive component in a base resin at positions where the non-adhesive portion and an adhesive portion are to be formed without curing the masking agent; curing the masking agent and the coating composition so as to form the coating film comprising the adhesive portion that is adhesive to the olefin resin liner and the non-adhesive portion that is non-adhesive or weakly adhesive to the olefin resin liner. Therefore, the adhesive portion is formed at a position coated with the coating composition other than the position coated with the masking agent, and the non-adhesive portion is formed at a position coated with the masking agent.

Effect of the Invention

As for the metal cap of the present invention, it is possible to form in a single step both an adhesive portion and a non-adhesive or weakly adhesive portion between the olefin resin liner and the metal cap shell, and this imparts excellent productivity. The favorable productivity imparts also excellent economic efficiency.

Further, the masking layer corresponding to the non-adhesive or weakly adhesive portion is covered entirely or partly with the coating composition containing the adhesive component. Therefore, even when the masking layer is scraped, it is possible to reduce the influence of the masking agent on the contents.

MODE FOR CARRYING OUT THE INVENTION

A metal cap of the present invention comprises: a metal cap shell having a top plate portion and a skirt portion extending downwardly from the periphery of the top plate portion, and an olefin resin liner on the top plate inner surface of the metal cap shell. A coating film comprising a coating composition containing an adhesive component in a base resin and a masking agent is formed between the top plate inner surface of the metal cap shell and the olefin-based resin liner. The coating film has an adhesive portion that is adhesive to the olefin resin liner and a non-adhesive portion that is non-adhesive or weakly adhesive to the olefin resin liner. The adhesive portion of the coating film is configured by positioning the adhesive component of the coating composition on the coating film surface, and the non-adhesive portion of the coating film has a masking layer of a masking agent at the side facing the metal cap shell, and on the coating film surface corresponding to the masking layer, a sea-island structure of the adhesive component of the coating composition as the dispersion phase and the base resin as the continuous phase is formed. This constitutes an important feature.

Figure 1:
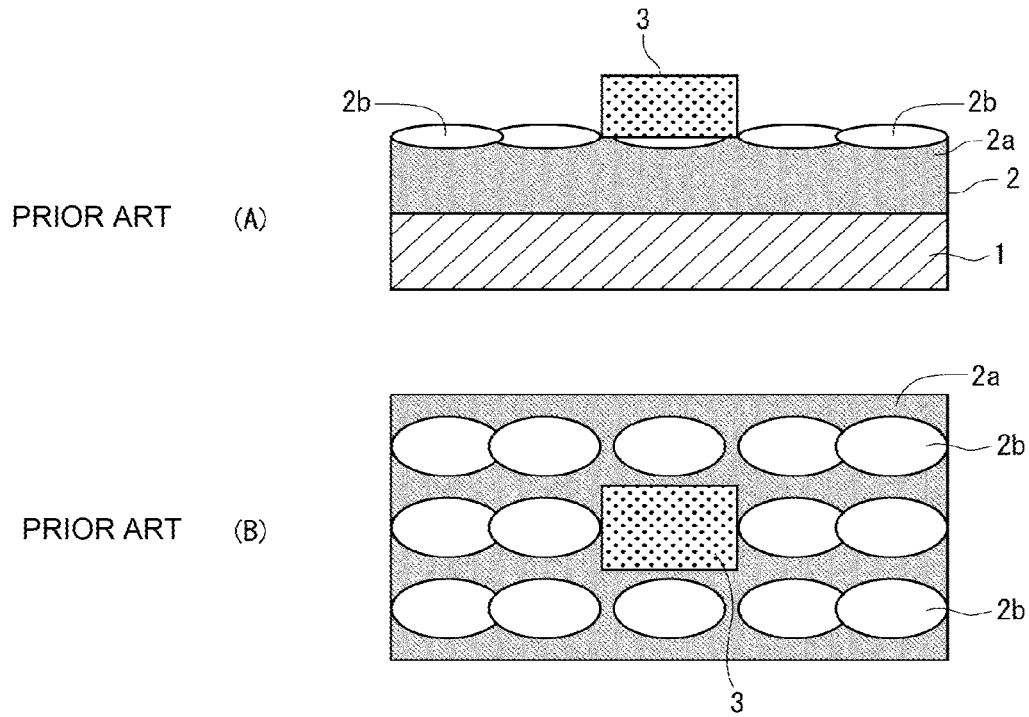
FIG. 1 consists of diagrams for explaining the structure of a conventional metal cap shell inner surface.
Figure 2:
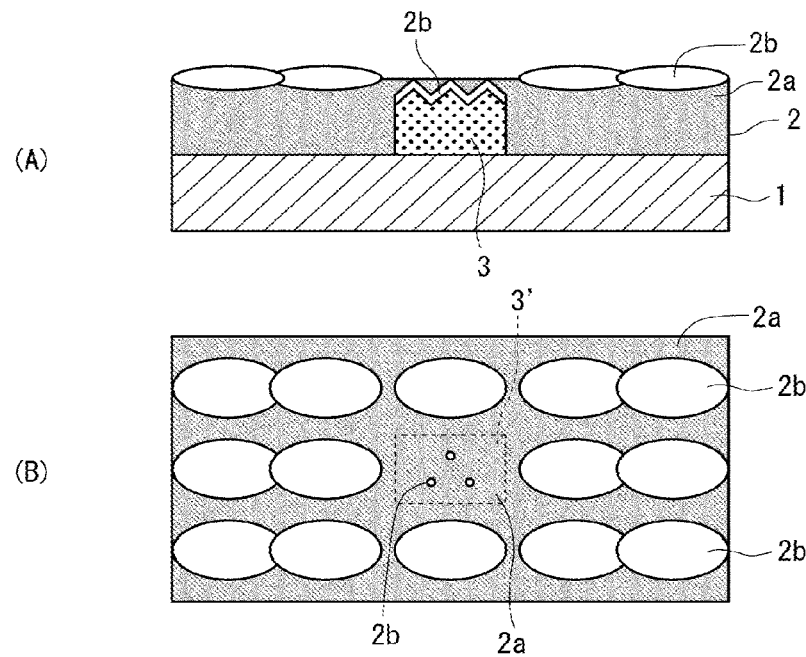
FIG. 2 consists of diagrams for explaining the structure of a metal cap shell inner surface used in the present invention.

FIGS. 1 and 2 are diagrams each illustrating the structure of a metal cap shell inner surface on which a coating film comprising a coating composition having an adhesive component and a masking layer are formed. In each of FIGS. 1 and 2, (A) is a cross-sectional schematic view and (B) is a top schematic view. FIG. 1 shows a conventional metal cap shell and FIG. 2 shows a metal cap shell to be used in the present invention.

As shown in FIG. 1(A), in the conventional metal cap shell, a coating film 2 is formed by coating and curing a coating composition containing an adhesive component 2*b* in a base resin 2*a* on an inner surface of a metal cap shell 1, and a masking layer 3 is formed by coating and curing a masking agent on a part to be non-adhesive or weakly adhesive on the coating film 2. As is apparent from FIG. 1(B), the adhesive component 2*b* exudes onto the coating film surface except for the part where the masking layer 3 is formed, whereby an adhesive portion (which may be called "adhesive region") is formed on the coating film 2, while the surface of the masking layer 3 forms a non-adhesive portion (which may be called "non-adhesive region") that is non-adhesive or weakly adhesive.

On the other hand, in the metal cap to be used in the present invention, as shown in FIG. 2(A), the masking layer 3 is formed at the part to be the non-adhesive region on the inner surface of the metal cap shell 1. Further, the coating composition containing the adhesive component 2*b* in the base resin 2*a* is coated at the part to be the adhesive region so as to cover also the masking layer 3, whereby the coating film 2 is formed. As is apparent from FIG. 2(B), for this coating film 2, in a region where the masking layer 3 is not formed, the adhesive component 2*b* exudes onto the surface to form an adhesive region, and at a position where the masking layer 3 is formed, a sea-island structure in which the adhesive component 2*b* is dispersed in the base resin 2*a* of the coating composition is formed. In the region where the sea-island structure is formed, since the area of the adhesive component 2*b* on the coating film surface is small, the adhesion to the olefin resin liner is lost or becomes weak, so that the coating film surface corresponding to the masking layer 3 is formed as the non-adhesive region. The masking layer 3 may be exposed partly on the coating film surface. However, when it is covered entirely or partly by the coating composition, its hardness is increased as compared with the coating film surface prepared in the conventional coating film formation step, so that the scratch resistance is improved, and the influence of the masking layer on the contents can be reduced.

It is important for the metal cap of the present invention that the masking agent is coated prior to the coating composition at the position for forming the non-adhesive region on the metal cap shell, and the coating composition is coated to cover the masking agent while the masking agent is not cured and is kept in a wet state, and then, both the masking agent and the coating composition are cured. This makes it possible to form a sea-island structure to make the aforementioned non-adhesive region on the surface corresponding to the masking layer. Although the mechanism that the sea-island structure is formed has not been clarified, it may be explained as follows. Since the masking agent coated on the surface of the metal cap shell is in a wet state at the time of coating the coating composition, irregularities are formed on the surface by coating the coating composition, and the wet masking layer helps the adhesive component in the coating composition to adhere to the irregularities. This decreases the amount of the adhesive component exuding to the coating film surface, whereby a sea-island structure is formed. In a case where the coating composition is coated and cured after curing the masking agent that has been coated to the metal cap shell, the surface corresponding to the masking layer cannot form the non-adhesive region because the adhesive component exudes onto the coating film surface similarly to the aforementioned adhesive region.

In the sea-island structure, it is preferable in the region area of the coating film corresponding to the masking layer (the projected area of the masking layer 3 onto the coating film surface shown in FIG. 2(A): the region indicated with the numeral 3' in FIG. 2(B)), the adhesive component 2b as a dispersion phase is in a range of 20 area % or less, particularly 4 to 18 area %. In a case where the area of the dispersion phase is larger than this range, the coating film surface corresponding to the masking layer does not become non-adhesive or weakly adhesive to the olefin resin liner, and the desired purpose cannot be achieved. In a case where the area of the dispersion phase is smaller than the aforementioned range, the amount of the adhesive component in the coating composition is small, and thus, the adhesion strength of the adhesive region imparted by the coating film may be weakened as compared with a case where the same area is within the range.

As for the metal cap of the present invention, the masking agent is preferably coated at a coating amount of 1 to 25 mg/dm$^2$, and the coating composition is preferably coated at a coating amount of 50 mg/dm$^2$ or less, particularly 25 to 45 mg/dm$^2$. In this manner, it becomes possible to reliably hold the olefin resin liner described later in the metal cap shell to exhibit excellent sealability and to easily peel the olefin resin liner from the metal cap shell if necessary, thereby enabling to easily detach the metal cap from the container mouth portion in a single action manner.

It is particularly preferable that the coating amount of the coating composition is larger than that of the masking agent so that the masking layer is completely covered with the coating composition. Thus, as described above, there is an advantage that it is not necessary to consider the influence of the masking agent on the contents and the like.

(Coating Composition)

As a coating composition for adhering and fixing the olefin resin liner to the top plate portion inner surface of the metal cap shell in the metal cap of the present invention, any of conventionally used coating compositions having adhesiveness to olefin resin liners of metal cap shells can be used.

Specifically, though there is no particular limitation, a coating composition comprises, as the base material, a thermosetting coating material such as an epoxy-phenol-based coating material, an epoxy-amino-based coating material, or a vinyl-phenol-based coating material, and as the adhesive component dispersed therein, an acid-modified olefin resin that is graft-modified with an ethylenically unsaturated carboxylic acid such as polyethylene oxide, maleic anhydride or acrylic acid or an anhydride thereof.

In addition to or in place of the aforementioned thermosetting coating materials as the base coating material, an ultraviolet curable coating material also can be used. Examples of the ultraviolet curable coating material include: an ultraviolet radical curable coating composition comprising an ultraviolet curable monomer or prepolymer such as an epoxy acrylate resin, a urethane acrylate resin, and a thermosetting acrylic resin and a photoradical polymerization initiator; a cationic curable coating composition comprising an ultraviolet curable epoxy resin as a resin component, a cationic ultraviolet photopolymerization initiator as a photoradical polymerization initiator, and if necessary, a cationic polymerization vinyl monomer known per se, a diluent, other epoxy resins, a sensitizer, a crosslinking agent and the like, though the present invention is not limited thereto.

The adhesive component is suitably contained in an amount of 1 to 15 parts by mass relative to 100 parts by mass of the base resin in the coating composition.

(Masking Agent)

In the present invention, the masking agent is used for forming, on the top plate portion inner surface of the metal cap shell of the metal cap, a region that is non-adhesive to the olefin resin liner. For the masking agent, an oil-modified alkyd resin, a Rosin, a Rosin-modified phenol resin, a petroleum resin or the like can be used. In particular, an oil-modified alkyd resin is preferably used in a case where the coating composition comprises an oxidized polyethylene or an acid-modified olefin-based resin as the adhesive component, and an epoxy-phenolic resin or a polyester-phenolic resin as the base resin. As a result, an adhesive component of the coating composition sufficiently adheres to the surface of the masking agent coated prior to the coating composition, and a sea-island structure having 20 area % or less of a dispersion phase of the adhesive component is formed on the surface of the coating film corresponding to the masking layer, so that a non-adhesive region can be efficiently formed.

(Olefin Resin Liner)

For the olefin resin liner to be used in the metal cap of the present invention, any known liners conventionally used for metal caps can be used. Examples of the olefin resin to make the liner include low-density polyethylene, medium-density polyethylene, high-density polyethylene, crystalline polypropylene, ethylene-propylene copolymer, and ethylene-propylene-butene-1 copolymer. From the viewpoint of sealability or the like, olefin resins based on low-density polyethylene can be suitably used.

Although it is possible to shape separately an olefin resin liner and to apply the liner to the metal cap shell, it is preferable that a molten resin is applied to the aforementioned metal cap shell top plate inner surface on which the inner coating film is formed in advance, which is then embossed to simultaneously perform shaping of the olefin resin liner and adhering to the inside the metal cap shell.

(Metal Cap Shell)

The metal cap shell used for the metal cap of the present invention can be formed of a metal plate used for conventional metal caps, and the examples include pure aluminum or aluminum alloys, tin-free steel, tinplate, and galvanized steel plates. Among them, aluminum plates can be used suitably in particular.

The shape is not particularly limited. In addition to the tear type as shown in FIG. 3 described later, conventionally known shapes of a screw cap, a stopper cap or the like can be used.

(Metal Cap)

The metal cap of the present invention can take various forms as long as it has an olefin resin liner on a coating film. Here, the coating film is formed by: coating the aforementioned masking agent to a part where a non-adhesive region is to be formed on a top plate portion of a metal cap shell; coating a coating composition, which is adhesive to the olefin resin liner, on the entire surface of the metal cap shell top plate inner surface while the masking agent is in a wet state, and curing the same.

Figure 3:
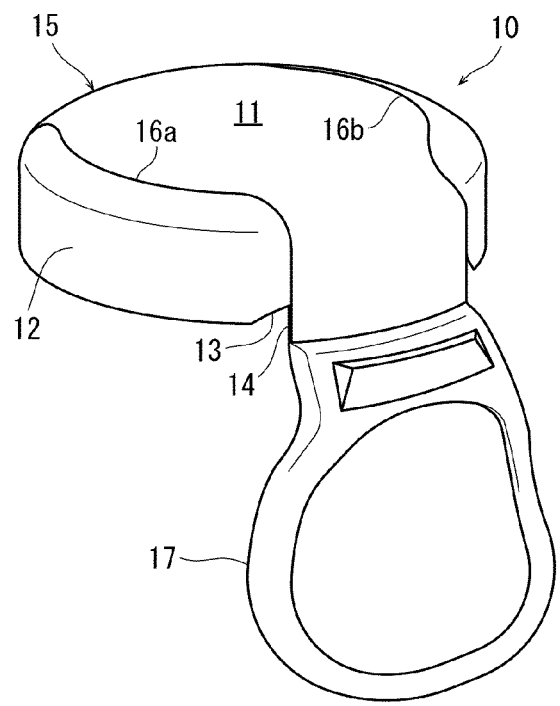
FIG. 3 is a diagram showing an example of a metal cap of the present invention.

For instance, as shown in FIG. 3, the cap of the present invention indicated as the numeral 10 as a whole comprises a metal cap shell 15 comprising a top plate portion 11, a skirt portion 12 extending downwardly from the top plate portion 11, and a grip portion 14 that further extends downwardly from the lower end 13 of the skirt portion and that is used for unsealing. A pair of weakened lines 16a, 16b are formed from the vicinity of the base of the grip portion 14 of the skirt portion lower end 13 through the upper end of the skirt portion to the top plate portion 11, then extending in the vicinity of the peripheral edge of the top plate portion 11. Further, a resin ring 17 for easier gripping is attached to the distal end of the grip portion 14. Though not shown in FIG. 3, an olefin resin liner is formed on the inner surface of the top plate portion 11 via an adhesive coating film, so that the container mouth portion will abut on the liner.

Figure 4:
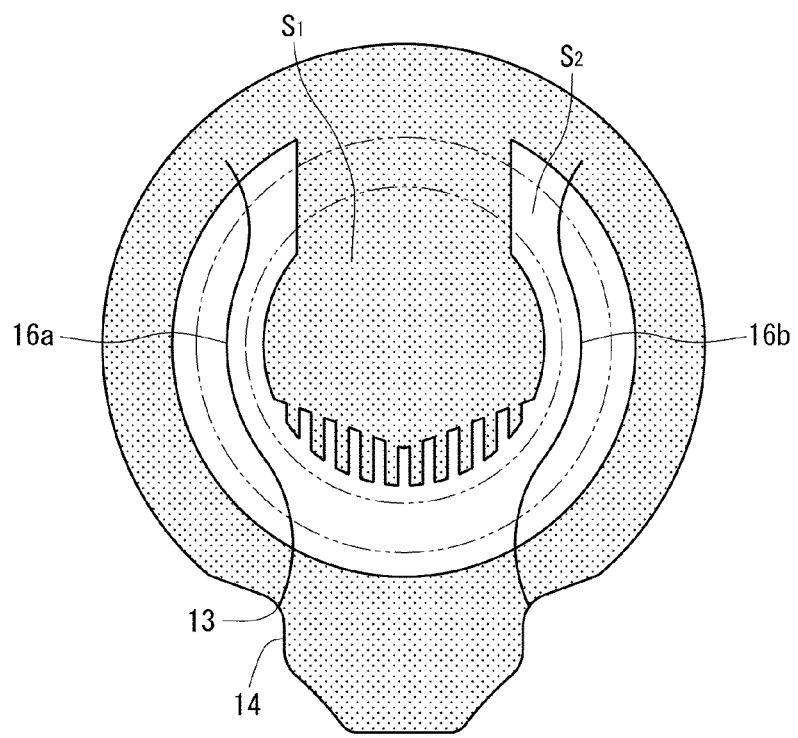
FIG. 4 is a plan view showing a state of a flat plate of the metal cap shown in FIG. 3 before shaping into a metal cap shell.

FIG. 4 is a plan view showing the side to be the cap inner surface in the metal plate before formation of the metal cap shell 15 of the metal cap shown in FIG. 3 (state a flat plate). In this embodiment, the dotted region is an adhesive region $S_1$, the white part is a non-adhesive region $S_2$, though the present invention is not limited to this pattern.

In the metal cap of this embodiment, since the weakened lines 16a and 16b are formed on the non-adhesive region $S_2$ of the top plate portion of the metal cap shell, the weakened lines can be easily broken. On the other hand, since the metal cap shell top plate central portion is in the adhesive region $S_1$, by further pulling up the grip portion 14 so as to break the weakened lines 16a and 16b, the olefin resin liner also can be removed integrally together with the metal cap shell, from the container mouth portion.

In addition to the embodiments shown in FIGS. 3 and 4, the metal cap of the present invention can be applied to a conventionally known metal cap with a prize function. A metal cap with a prize function has a prize display on the top plate inner surface of the metal cap shell or the olefin resin liner inner surface, so that the display can be confirmed by peeling the liner from the inside of the metal cap shell. In this case, the metal cap shell may be a screw cap or a stopper cap.

Needless to say, it is also possible to form the non-adhesive region not for peeling the liner but for the purpose of improving its impact resistance sealability and stress cracking resistance, like the cap described in the aforementioned JP S58-171359 A.

EXAMPLES

Excellent effects of the present invention will be described below by referring to the following Examples and Comparative Examples.

Materials and evaluation methods used in the Examples are as follows.
(Coating Composition)

For the coating composition, an epoxy phenol-based coating material containing 90 mass % of epoxy resin and 10 mass % of phenol resin as the base resins (base coating materials) and 10 phr of acid-modified polyethylene as the adhesive component were used.
(Masking Agent)

For the masking agent, an oil-modified alkyd resin was used.
(Coating Film Formation Step)

As shown in FIG. 4, 10 mg/dm² of the masking agent was coated on the non-adhesive region $S_2$ (shown in white) of the aluminum-based alloy thin plate prior to shaping into the metal cap shell, and then, while the masking agent is in a wet state, 30 mg/dm² to 50 mg/dm² of the coating composition containing the aforementioned adhesive component was coated on the entire surface of the metal cap shell top plate portion inner surface. This was baked in an oven at 180° ° C. for 10 minutes, whereby the masking agent and the coating composition were cured to form a coating film.
(Metal Cap Shell)

For the metal cap shell, an aluminum-based alloy thin plate having a thickness of 0.24 mm (JIS A5052), which was press-molded after the coating film formation step, was used. The outer diameter of this shell known per se is 27.0 mm, the height is 7.0 mm (see JP 2003-191982A).
(Olefin Resin Liner)

The top plate portion inner surface of the shell was subjected to high frequency induction heating, to which an olefin resin liner material containing 1000 ppm of a lubricant was supplied together with 80 mass % of linear low-density polyethylene and 20 mass % of olefinic rubber, and the liner was press-molded. The liner known per se has a diameter of 24.75 mm (see JP 2003-191982A).
(Metal Cap)

As a metal cap shell, the metal cap shell shown in FIG. 3 was used. The aforementioned olefin resin liner was formed on the inner surface of the top plate portion of the metal cap shell via an adhesive coating film.

The metal cap prepared in each Example or Comparative Example was mounted on the mouth-neck portion of a predetermined glass container adjusted to the outer diameter of the shell, and evaluations for the metal cap were performed by the following methods.
(Openability)

The ring 17 of the metal cap 10 was pulled outwardly in the radial direction and upwardly to disengage the metal cap 10 from the mouth-neck portion of the container so as to open the container. During breaking the latter half of the pair of scores at the time of such opening, the maximum value of the required force was measured, and evaluated in comparison with that of a metal cap (conventional product) prepared in the coating film formation step shown in <Conventional Example> described below.

o: The opening force is equivalent to that of the conventional product.

x: The opening force is higher than that of the conventional product.

(Liner Adhesiveness)

The olefin resin liner of the metal cap 10 was pulled in a direction to be separated from the inner surface of the top plate portion 11, and the maximum value of the force required at the time of peeling off the olefin resin liner was measured. The value was evaluated in comparison with that of the metal cap (conventional product) prepared in the coating film formation step shown in <Conventional Example> described below.

o: The adhesive force is equivalent to that of the conventional product.

$x_1$: The adhesive force is lower than that of the conventional product.

$x_2$: The adhesive force is higher than that of the conventional product.

Example 1

In the aforementioned (Coating film formation step), 30 mg/dm² of a coating composition containing an adhesive component was used to prepare a metal cap. The aforementioned evaluations were performed using this metal cap. The results are as follows.

Openability: o
Liner adhesiveness: o

Example 2

In the aforementioned (Coating film formation step), 40 mg/dm² of a coating composition containing an adhesive component was used to prepare a metal cap. The aforementioned evaluations were performed using this metal cap. The results are as follows.
Openability: o
Liner adhesiveness: o Example 3

In the aforementioned (Coating film formation step), 50 mg/dm² of a coating composition containing an adhesive component was used to prepare a metal cap. The aforementioned evaluations were performed using this metal cap. The results are as follows.
Openability: o
Liner adhesiveness: o Comparative Example 1

A metal cap was prepared in the same manner as in Examples except that 20 mg/dm² of a coating composition containing an adhesive component was used in the (Coating film formation step) of Examples. The aforementioned evaluations were performed using this metal cap. The results are as follows.
Openability: o
Liner adhesiveness: $x_1$ Comparative Example 2

A metal cap was prepared in the same manner as in Examples except that 60 mg/dm² of a coating composition containing an adhesive component was used in the (Coating film formation step) of Examples. The aforementioned evaluations were performed using this metal cap. The results are as follows.
Openability: x
Liner adhesiveness: $x_2$ Comparative Example 3

As shown in FIG. 4, 10 mg/dm² of the same masking agent as in Examples was coated on the non-adhesive or weakly adhesive region shown in white of the aluminum-based alloy thin plate prior to shaping into a metal cap shell. This was baked in an oven at 180° C. for 10 minutes to cure the masking agent, whereby a coating film was formed. Thereafter, 40 mg/dm² of a coating composition containing the same adhesive component as in Examples was coated on the entire surface of the metal cap shell top plate portion inner surface, and baked in an oven at 180° C. for 10 minutes to cure the coating composition, thereby forming a coating film. After that, a metal cap was prepared in the same manner as in Examples. The aforementioned evaluations were performed using this metal cap. The results are as follows.
Openability: x
Liner adhesiveness: $x_2$ Conventional Example On an aluminum-based alloy thin plate prior to shaping into a metal cap shell, 40 mg/dm² of a coating composition containing the same adhesive component as in Examples was coated, specifically, on the entire surface of the metal cap shell top plate inner surface. This was baked in an oven at 180° C. for 10 minutes to cure the coating composition, whereby a coating film was formed. Thereafter, as shown in FIG. 4, 10 mg/dm² of the same masking agent as in Examples was coated on the non-adhesive region $S_2$ shown in white, which was baked again in an oven at 180° C. for 10 minutes to cure the masking agent, thereby forming a coating film.

Except for that, the same process as in Examples was performed to prepare a metal cap (conventional product).

<Scratch Resistance>

From the aluminum-based alloy thin plate obtained after the coating film formation step of Example 2 and the aforementioned Conventional Example, specimens each having a coating film surface corresponding to the masking layer were cut out at a predetermined length. For these specimens, the pencil hardness test defined by the scratch hardness test method (JIS K 5600-5-4) was performed to compare and evaluate the scratch resistance. The results are as follows.

Example 2: Pencil Hardness=3H to 4H

Conventional Example: Pencil Hardness=F to H

<Observation of Sea-Island Structure>

Figure 5:
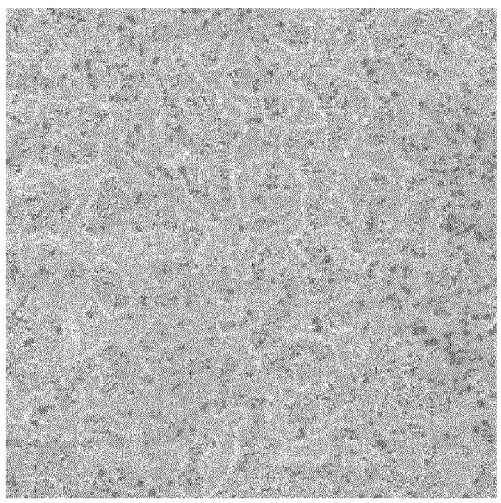
FIG. 5 consists of images obtained by binarization of scanning electron microscopic image data of the coating film surfaces corresponding to the masking layers of Example 2 and Conventional Example: (A) relates to Example 2 and (B) relates to Conventional Example.
Figure 5:
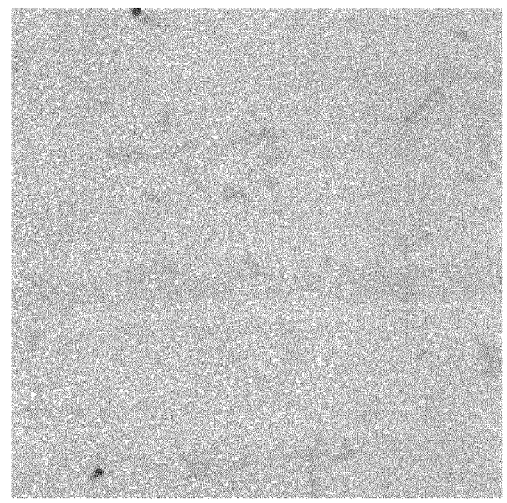

From the aluminum-based alloy thin plates obtained after the coating film formation steps of Example 2 and the aforementioned Conventional Example, the coating film surfaces corresponding to the masking layer were cut out, and observed at a magnification of 150 times using a scanning electron microscope S-3400N supplied by Hitachi High-Tech Corporation (trimmed to an image size 250×250 pixels). The electron microscopic image data was binarized using an image analysis software "Image J", and an image quantitative analysis of polyethylene (parts indicated with black dots in photographs of FIG. 5) of the adhesive component in the region area of the coating film surface corresponding to the masking layer was performed. The results are as follows.

Example 2: 9 Area %

Conventional Example: 0 area %

EXPLANATIONS OF LETTERS OR NUMERALS

1 Metal cap shell, 2 Coating film, 2a Base resin, 2b Adhesive component, 3 Masking layer, 10 Metal cap, 11 Top plate portion, 12 Skirt portion, 16 Weakened line

The invention claimed is:
1. A metal cap comprising: a metal cap shell having a top plate portion, a skirt portion extending downwardly from the periphery of the top plate portion, a grip portion that further extends downwardly from a lower end of the skirt portion and that is used for unsealing, and a pair of weakened lines formed from the vicinity of a base of the grip portion to the lower end of the skirt portion and through an upper end of the skirt portion to the top plate portion; and an olefin resin liner on the top plate portion inner surface of the metal cap shell, wherein
a coating film is formed between the top plate portion inner surface of the metal cap shell and the olefin resin liner, the coating film comprises a coating composition containing an adhesive component in a base resin and a masking agent, and the coating film has an adhesive portion that is adhesive to the olefin resin liner and a non-adhesive portion that is non-adhesive or weakly adhesive to the olefin resin liner, the adhesive portion of the coating film is formed by positioning the adhesive component of the coating composition on the coating film surface, the non-adhesive portion of the coating film has a masking layer of the masking agent at a side facing the metal cap shell, and a sea-island structure is formed on the coating film surface corresponding to the masking layer in which the adhesive component of the coating composition is a dispersion phase and the base resin is a continuous phase, a coating amount of the masking agent is 1 to 25 mg/dm$^2$, a coating amount of the coating composition is 25 to 45 mg/dm$^2$, the coating amount of the coating composition is larger than the coating amount of the masking agent, and the masking layer is covered entirely or partly with the coating composition, and the dispersion phase in the sea-island structure is 4 to 18 area %.

2. The metal cap according to claim 1, wherein the masking agent is an oil-modified alkyd resin, and the coating composition comprises an oxidized polyethylene or an acid-modified olefin-based resin as the adhesive component and an epoxy-phenol resin or a polyester-phenol resin as the base resin.

3. A method for manufacturing a metal cap that comprises: a metal cap shell having a top plate portion, a skirt portion extending downwardly from the periphery of the top plate portion, a grip portion that further extends downwardly from a lower end of the skirt portion and that is used for unsealing, and a pair of weakened lines formed from the vicinity of a base of the grip portion to the lower end of the skirt portion and through an upper end of the skirt portion to the top plate portion; and an olefin resin liner via a coating film on the top plate portion inner surface of the metal cap shell, the method comprising:

coating a masking agent on the top plate portion inner surface of the metal cap shell, at a position on which a non-adhesive portion that is non-adhesive or weakly adhesive to the olefin resin liner is to be formed;

coating a coating composition containing an adhesive component in a base resin at positions where the non-adhesive portion and an adhesive portion are to be formed, without curing the masking agent; and curing the masking agent and the coating composition so as to form the coating film comprising the adhesive portion that is adhesive to the olefin resin liner and the non-adhesive portion that is non-adhesive or weakly adhesive to the olefin resin liner, the adhesive portion is formed at a position coated with the coating composition other than the position coated with the masking agent, and the non-adhesive portion is formed at a position coated with the masking agent, wherein the adhesive portion of the coating film is formed by positioning the adhesive component of the coating composition on the coating film surface, the non-adhesive portion of the coating film has a masking layer of the masking agent at a side facing the metal cap shell, and a sea-island structure is formed on the coating film surface corresponding to the masking layer in which the adhesive component of the coating composition is a dispersion phase and the base resin is a continuous phase, a coating amount of the masking agent is 1 to 25 mg/dm$^2$, a coating amount of the coating composition is 25 to 45 mg/dm$^2$, the coating amount of the coating composition is larger than the coating amount of the masking agent, and the masking layer is covered entirely or partly with the coating composition, and the dispersion phase in the sea-island structure is 4 to 18 area %.

* * * * *